No. 763,890. PATENTED JUNE 28, 1904.
G. T. E. HENRIKSEN.
SAFETY GRATING.
APPLICATION FILED DEC. 2, 1903.
NO MODEL.
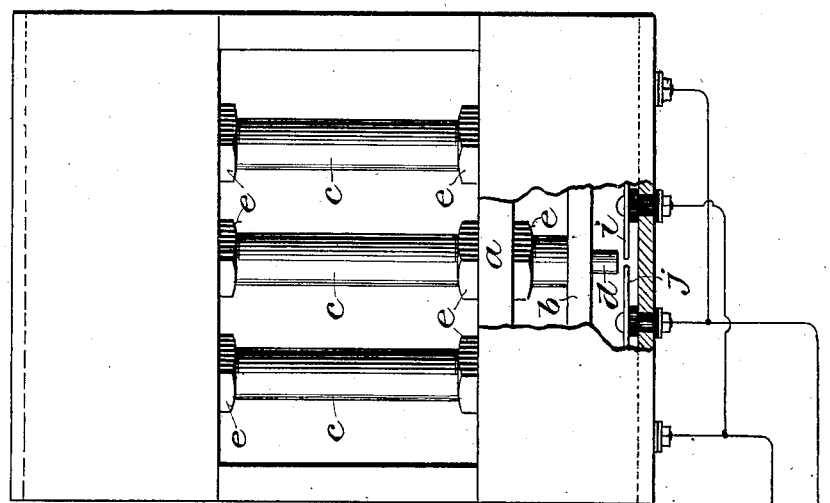
Fig. 2.
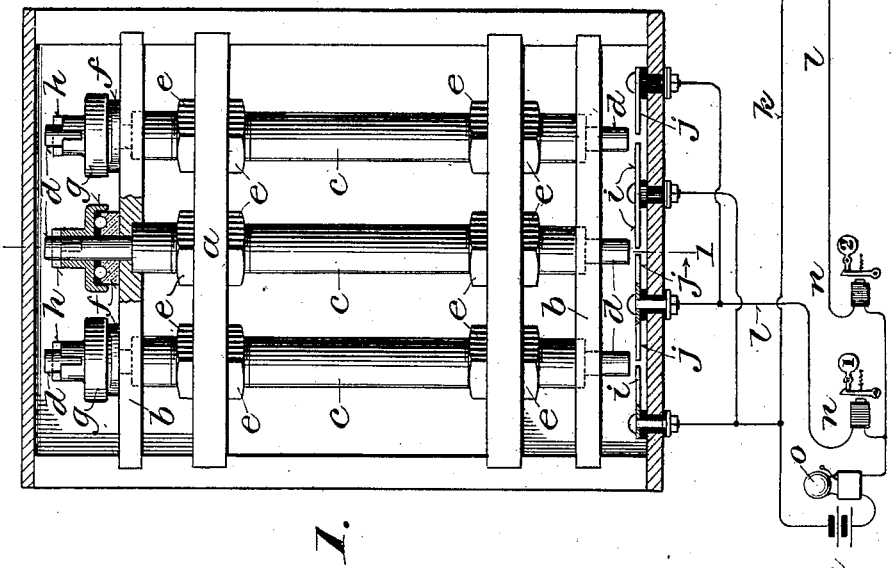
Fig. 1.
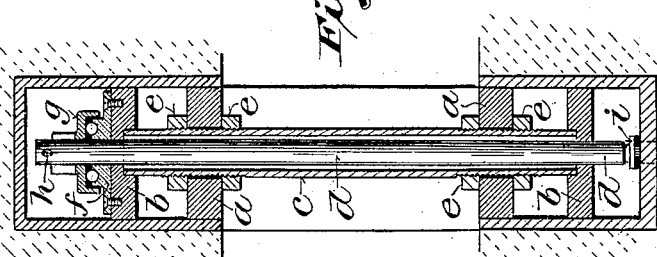
Witnesses:
Geo. W. Young
Chas. L. Loos.
Inventor:
Gustav T. E. Henriksen
By Winter, Flanders, Smith, Bothun & Nuhns
Attorneys.
THE NORRIS PETERS CO., PHOTO-LITHO., WASHINGTON, D. C.

No. 763,890. Patented June 28, 1904.

UNITED STATES PATENT OFFICE.

GUSTAV T. E. HENRIKSEN, OF MILWAUKEE, WISCONSIN.

SAFETY-GRATING.

SPECIFICATION forming part of Letters Patent No. 763,890, dated June 28, 1904.

Application filed December 2, 1903. Serial No. 183,447. (No model.)

*To all whom it may concern:*

Be it known that I, GUSTAV T. E. HENRIKSEN, a citizen of the United States, residing at Milwaukee, in the county of Milwaukee and State of Wisconsin, have invented certain new and useful Improvements in Safety-Gratings, of which the following is a specification, reference being had to the accompanying drawings, forming a part thereof.

The main objects of this invention are to prevent severing grating-bars and to give an alarm in case of an attempt to do so.

It consists in certain novel features of construction and in the peculiar arrangement and combinations of parts, as hereinafter particularly described, and pointed out in the appended claims.

The invention is applicable to jail, bank, residence, or other windows, doors, or openings where protection is desired against escape of prisoners or admission of burglars.

In the accompanying drawings like letters designate the same parts in both figures.

Figure 1 is a vertical section on the line 1 1, Fig. 2, of a grating embodying my invention and its casing; and Fig. 2 is a front elevation of two gratings, parts being broken away and shown in section and the electric-alarm connections being shown in diagram.

The grating is composed of horizontal cross-bars $a\ a$ and $b\ b$ and of vertical bars consisting of tubes $c$, secured in said cross-bars, and rods $d$, revolubly suspended in said tubes. The tubes $c$ may be threaded at or near their ends and secured in openings therefor in the bars $a$ by nuts $e$, and at their ends they are preferably countersunk into the cross-bars $b$, which close their ends around the rods $d$ and may be utilized as a part of boxes or casings to inclose the pivotal supporting devices at the upper ends of the rods and the electrical connections at the lower ends thereof. The cross-bars, particularly the bars $a\ a$, may be anchored or otherwise secured at their ends in the stiles or sides of the window, door, or other frame or opening protected by the grating. The cross-pieces $b$ may be made removable, or they may be secured in like manner in the stiles or sides of the window, door, or other frame or opening. The upper and lower ends of the vertical bars are incased and made inaccessible from the opening protected by the grating; but some means of access to the upper or lower ends of the rods $d$ is provided for the purpose of resetting said rods in case they are unseated from their pivot-supports in an attempt to sever the bars. Annular ball races or bearings $f\ f$ are provided on the upper cross-bar $b$ around the several rods $d$, and above these bearings said rods pass loosely through flanged collars $g$, which rest on balls interposed between them and the bearings $f$. The upper ends of the rods $d$ are provided with cross pieces or pins $h$, which normally rest on the upwardly-projecting hubs of the collars $g$, and thereby pivotally suspend said rods in the tubes $c$. The hubs of the collars $g$ are notched on opposite sides to receive the cross pieces or pins $h$ and permit the rods $d$ to drop when they are turned in an attempt to sever the vertical bars with a saw or file.

Below the lower ends of the rods $d$ are arranged insulated electric contact-pieces $i$ and $j$ in position to be engaged and electrically connected by said rods in case they are released and permitted to drop. The contact-pieces $i$ and $j$ are connected with the opposite sides of an electric circuit $k$ and $l$, including a battery $m$ and indicator $n$, and, if desired, a bell $o$ or other alarm-signal, which may all be located at a distance from the grating in the office of a jail or in any other desired location.

Normally the rods $d$ are suspended by their cross pieces or pins $h$, resting on the hubs of the collars $g$ out of engagement with the contact-pieces $i$ and $j$, and the electric-alarm circuits are open, as shown in the drawings. One set of contact-pieces—as, for example, the contact pieces $j$—and the indicator $n$ for each individual grating are included in a separate branch $l$ of the electric circuit, so that the particular location of any grating where an attempt is made to enter or escape by severing the bars will be designated when the alarm is given.

In case an attempt is made to enter or escape through an opening provided with my improved grating by cutting a bar with a saw or file and the outer sleeve c of a bar is penetrated, the saw or file will then come in contact with the inclosed rod d, which will be turned thereby without being cut. The turning of the rod d will by reason of the inertia of the collar g, from which it is suspended, carry the cross piece or pin h over and into the notches in said collar. The rod will thereupon drop and engage at its lower end with the opposing contact-pieces i and j, thereby closing the electric circuit through the battery m, the corresponding indicator n, and the bell or other alarm-signal o. Information will thus be given at once at some suitable and convenient point that an attempt is being made to enter or escape through an opening protected by one of the gratings, and the location of that opening will be indicated. After the cross-pins h drop into the notches in the collars g any subsequent effort to saw or sever the rods will rotate them with the collars, and thus be frustrated.

Various changes in minor details of construction may be made within the principle and intended scope of the invention.

I claim—

1. The combination of a grating-bar composed of an outer tube and a rod revoluble and movable endwise therein, an electric alarm adapted to be operated by the dropping of said rod, and means adapted to normally support said rod out of operative relation to the alarm and to permit it when turned, to drop into operative relation thereto, substantially as described.

2. The combination of a grating-bar composed of an outer tube and a rod loosely fitted therein and provided with a cross-piece, a revoluble support having a raised part on which said cross-piece normally rests and relative to which it may be turned so as to permit the rod to fall, and an electric-alarm circuit adapted to be closed by the release and fall of said rod, substantially as described.

3. The combination of a grating-bar composed of a tube and a rod fitted to turn therein and provided at its upper end with a cross-piece, a notched collar loosely surrounding the upper end of said rod and supported by a ball-bearing on a cross-bar, the cross-piece of said rod normally resting on said collar and thereby suspending said rod in said tube, and an electric-alarm circuit adapted to be closed by the fall of said rod when its cross-piece drops into the notch in said collar, substantially as described.

4. The combination of a grating composed of cross-bars, of vertical tubes secured in said bars, and of rods revoluble and movable endwise in said tubes, an electric alarm adapted to be operated by the release of any of said rods, and means normally supporting said rods out of operative relation to said alarm and adapted to release them when they are turned in said tubes, substantially as described.

5. The combination in a grating for window and other openings, of cross-bars, vertical tubes secured in said bars and inaccessible at the ends, rods fitted to turn freely in said tubes and provided at their upper ends with cross-pieces, notched collars revolubly supported by a cross-bar around the upper ends of said rods and normally suspending said rods by their cross-pieces resting thereon, and an electric-alarm circuit adapted to be closed by the fall of any of said rods when it is turned and its cross-piece drops into the notch of its suspending-collar, substantially as described.

6. The combination of a number of gratings each comprising bars composed of tubes and of rods revoluble and movable endwise therein, an electric-alarm circuit including indicating mechanism and circuit-closers arranged to be operated by the release of the associated rods to designate the location of a grating in which an attempt is made to sever a bar, and revoluble supports normally holding said rods out of operative relation to said circuit-closers and adapted to release said rods when they are turned in said tubes, substantially as described.

In witness whereof I hereto affix my signature in presence of two witnesses.

GUSTAV T. E. HENRIKSEN.

Witnesses:
 CHAS. L. GOSS,
 MAUDE L. EMERY.